(12) United States Patent
Colamussi

(10) Patent No.: US 6,622,617 B1
(45) Date of Patent: Sep. 23, 2003

(54) APPARATUS FOR THE FOLDING OF CROISSANTS

(75) Inventor: Arturo Colamussi, Ferrara (IT)

(73) Assignee: Vortex Systems S.r.l., Fossalta-Ferrara (IT)

( * ) Notice: Subject to any disclaimer, the term of this patent is extended or adjusted under 35 U.S.C. 154(b) by 0 days.

(21) Appl. No.: 10/378,352

(22) Filed: Mar. 3, 2003

(30) Foreign Application Priority Data

Mar. 6, 2002 (IT) .................................. MI2002A0464

(51) Int. Cl.[7] .................... A21C 3/06; A21C 11/00; A21C 1/00; A21D 6/00; A23L 1/00
(52) U.S. Cl. ................... 99/450.2; 99/353; 99/450.1; 425/92; 425/321; 425/325; 425/335
(58) Field of Search ................ 99/353, 450.1, 99/450.2, 450.3, 450.7, 450.8, 450.6, 494; 425/92, 321, 322, 115, 325, 141, 329, 145, 335, 194, 391, 239, 363, 373; 426/500–503, 512, 231; 198/456, 379, 468.3; 414/783

(56) References Cited

U.S. PATENT DOCUMENTS

| | | | | |
|---|---|---|---|---|
| 4,313,719 A | * | 2/1982 | Lundgren | 425/335 |
| 4,441,408 A | * | 4/1984 | Costa | 99/450.2 |
| 4,582,472 A | * | 4/1986 | Hanson | 425/139 |
| 4,905,583 A | * | 3/1990 | Hayashi | 425/321 X |
| 4,961,697 A | * | 10/1990 | De Fockert et al. | 99/353 X |
| 4,996,915 A | * | 3/1991 | Morikawa et al. | 99/450.2 |
| 5,018,439 A | * | 5/1991 | Bordin | 99/450.7 X |
| 5,078,585 A | * | 1/1992 | Morikawa et al. | 425/321 X |
| 5,281,120 A | * | 1/1994 | Morikawa et al. | 426/512 X |
| 5,440,974 A | * | 8/1995 | Ueno et al. | 99/450.2 |
| 5,460,081 A | * | 10/1995 | Ueno et al. | 99/450.1 X |
| 5,606,906 A | * | 3/1997 | Finkowski et al. | 425/92 X |
| 5,609,094 A | * | 3/1997 | Ueno et al. | 99/450.2 |

* cited by examiner

*Primary Examiner*—Timothy F. Simone
(74) *Attorney, Agent, or Firm*—Hedman & Costigan, P..C.

(57) ABSTRACT

An apparatus for the folding of croissants comprising, in series, downstream of at least one preparation station of rolls of pastry, obtained from triangles of pastry rolled up with one pointed central external end, and fed one after another, a positioning station with a pre-determined pitch distance of the rolls in a central position with respect to underlying conveying devices, an oriented positioning station of the pointed end on the underlying conveying devices and a U-folding station of the rolls, in which the folding station comprises front and rear gages for each roll and rotating side gages for the folding of opposite ends of each roll, the oriented positioning station and the folding station being movable alternately forwards and backwards.

11 Claims, 6 Drawing Sheets

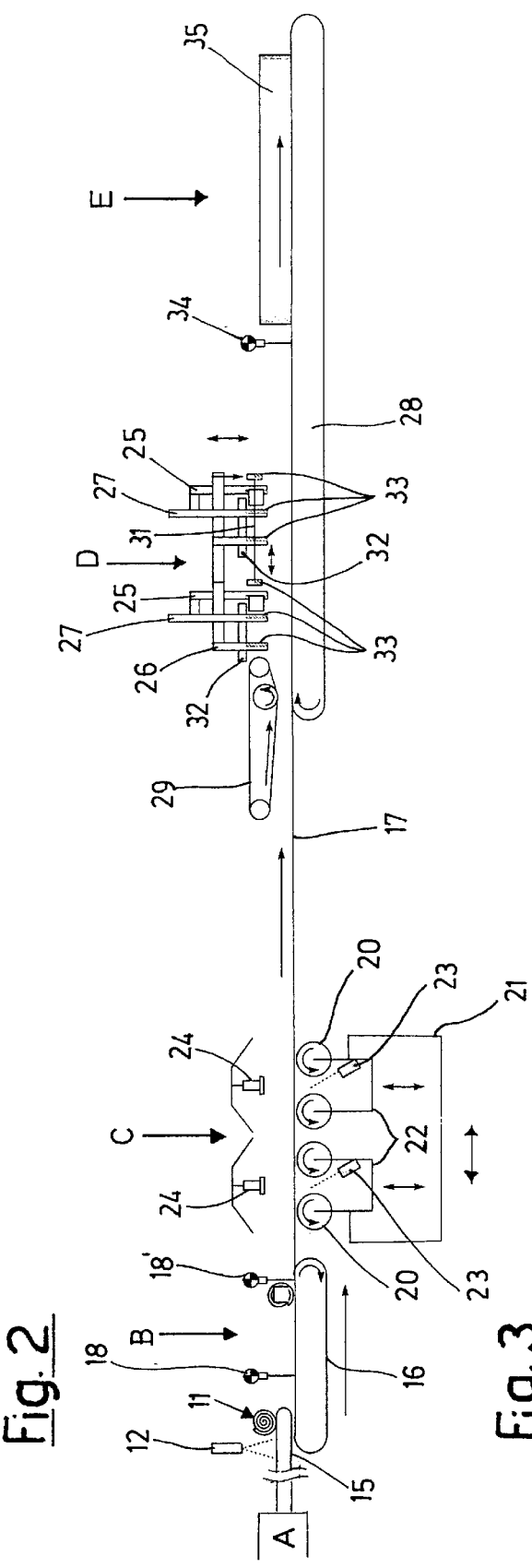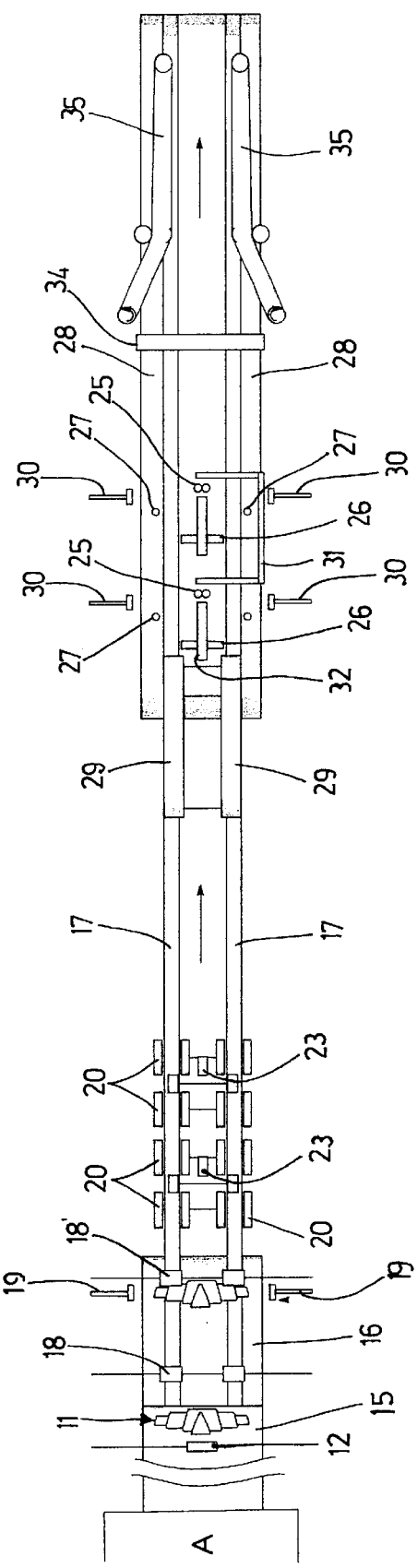

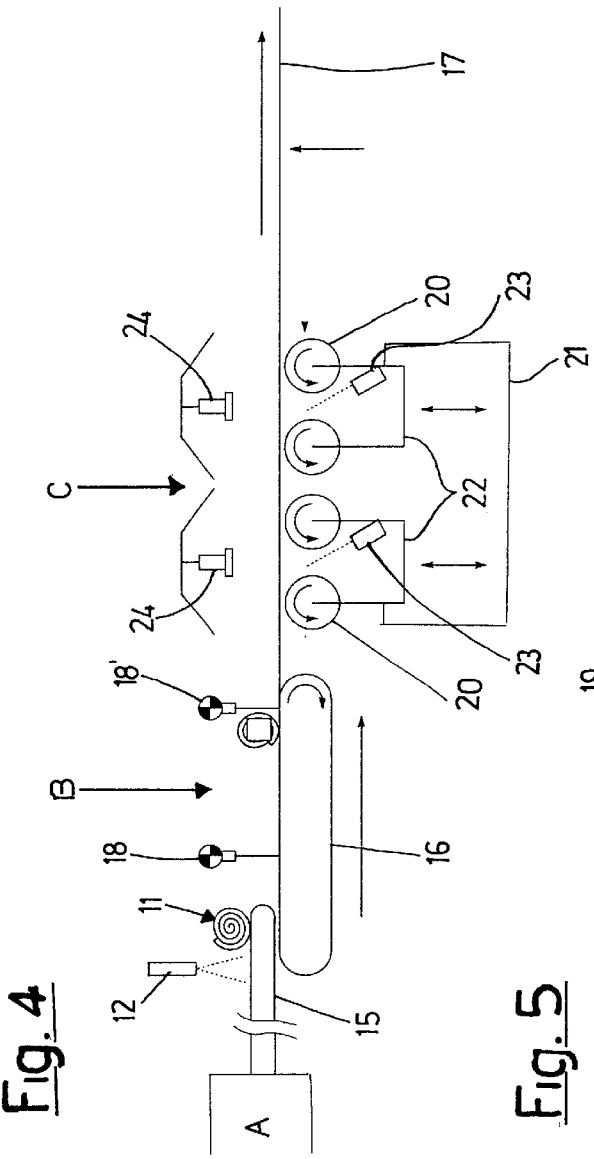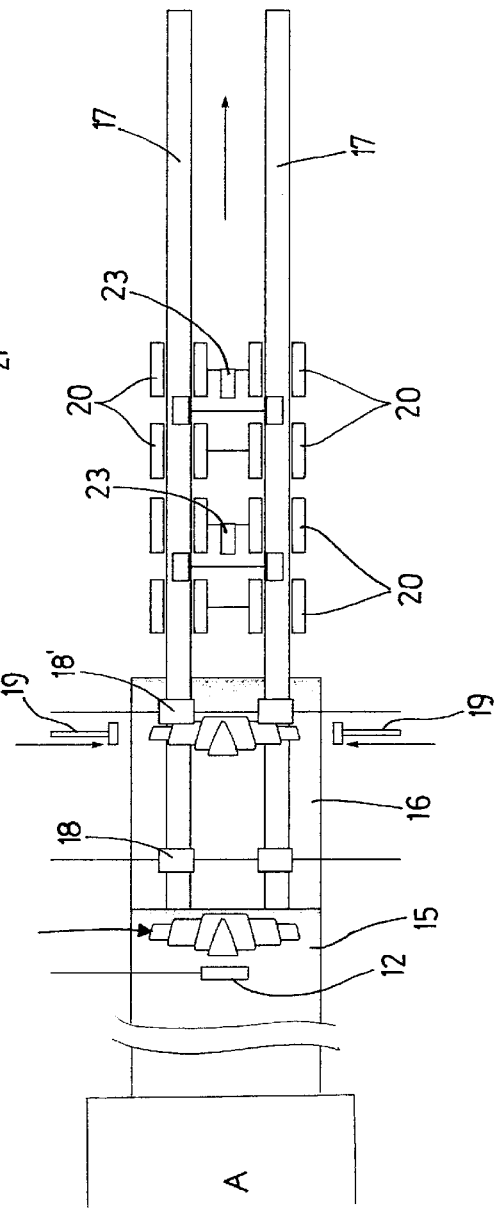

Figure 1:
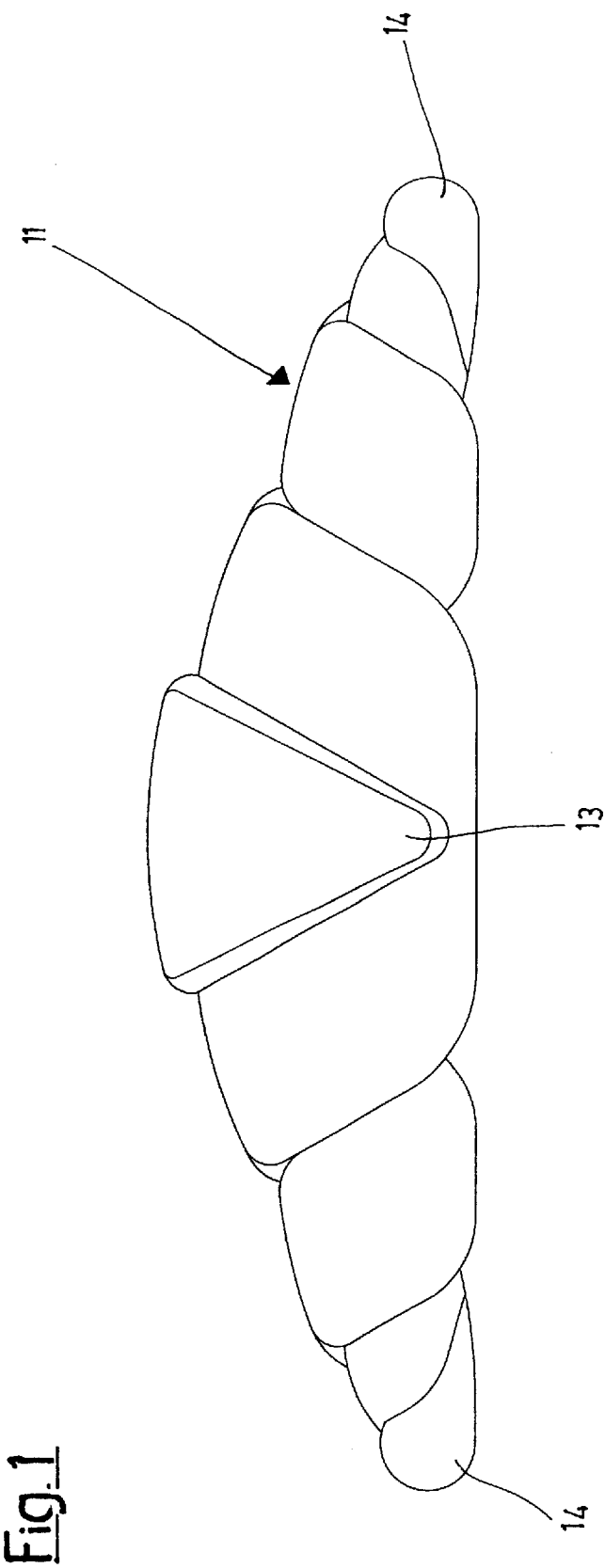

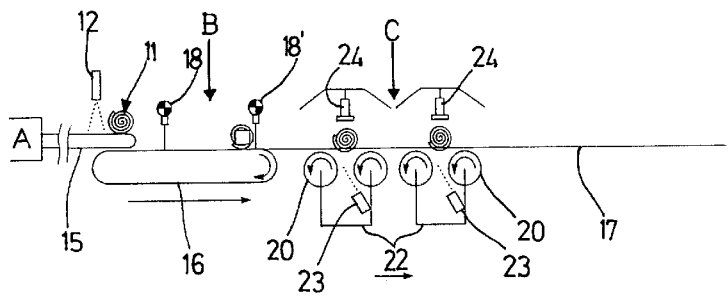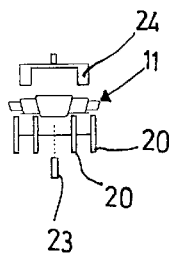
Fig.6
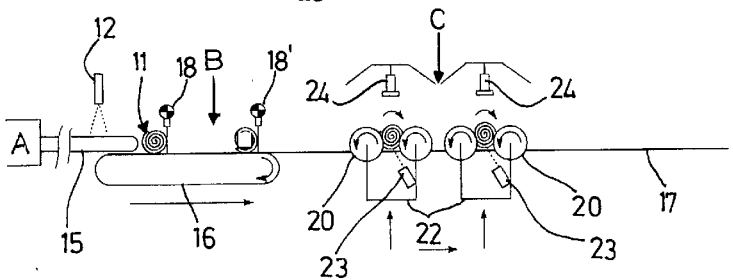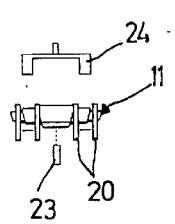
Fig.6a
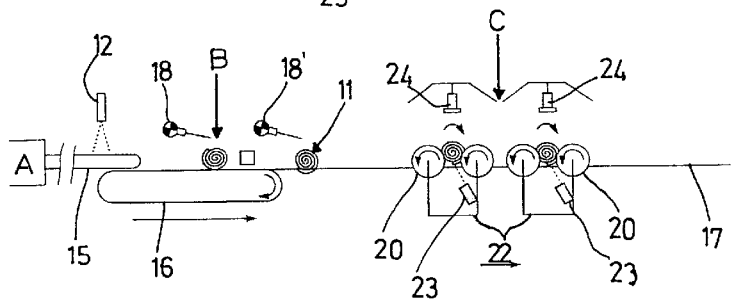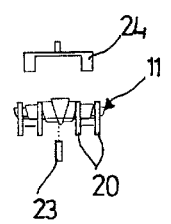
Fig.6b
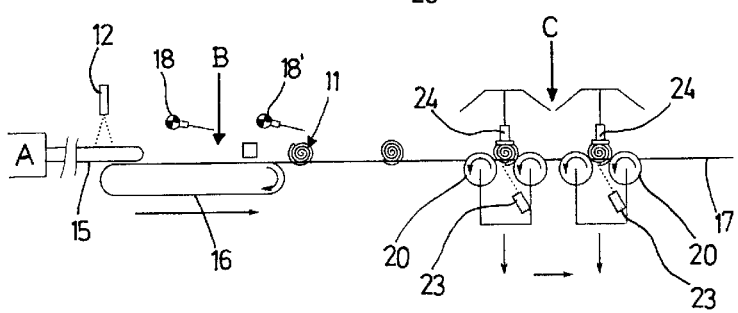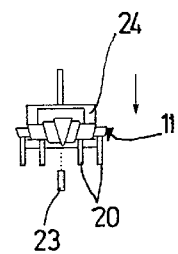
Fig.6c
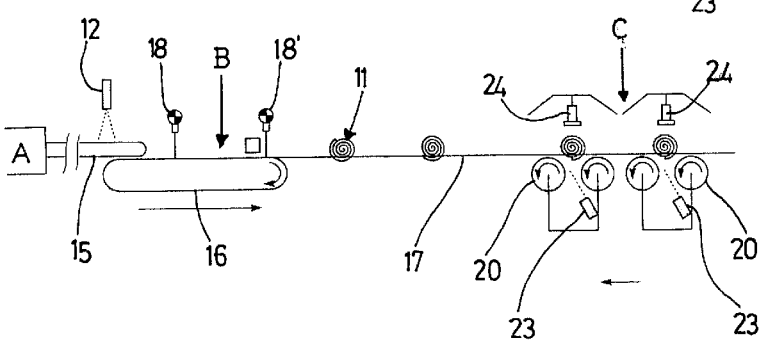
Fig.6d

APPARATUS FOR THE FOLDING OF CROISSANTS

The present invention relates to an apparatus for the folding of croissants.

It should be stated beforehand that in the field of food products, the term croissant refers to a pastry product folded in a half-moon shape.

The current production process of croissants is generally as described below.

The pastry is cut into triangles which are then rolled up: a machine of this type operates on several rows to obtain a sufficient production capacity. In order to reach the desired capacity, the machines, in fact, generally operate on six rows at a time.

During the rolling operation, an additional component may or may not be inserted, such as cream, chocolate, jam, etc., which forms the so-called filling of the croissant.

At the end of the rolling operation, the croissants, with or without an additional component, fall onto a collecting belt from which they are removed by the operating staff, manually folded and deposited on a belt or baking-trays.

It should be noted that the folding should be effected with the point of the pastry triangle situated under the croissant, i.e. between the croissant and the supporting surface. In particular, the folding operation is correctly performed when the end of the triangle is situated at a point ranging from the middle to the front part of the croissant itself.

It should be pointed out that the operators should pay particular attention to this aspect. If this is not the case, the croissant, after leavening and baking, will lose its characteristic shape.

It should also be remembered that the product, after folding, can be sent for freezing, or leavening followed by freezing, or leavening followed by baking, depending on the specific requirements.

In view of these problems, it should be noted that many attempts have been made for the mechanized and/or automatic folding of rolled pastry, but without any success as of today.

An objective of the present invention is to provide an apparatus for the folding of croissants as described above which overcomes the technical problems previously met.

A further objective is to effect a correct folding of the rolled pastry which prevents the formation of subsequent defects.

Another objective is to obtain a mechanization of the folding process currently effected manually.

Yet another objective is to provide an apparatus for the folding of croissants which has a simple structure and is easy to operate.

These and other objectives according to the present invention are achieved by means of an apparatus for the folding of croissants as illustrated in claim 1.

Further characteristics of the invention are described in the subsequent claims.

Figure 7:
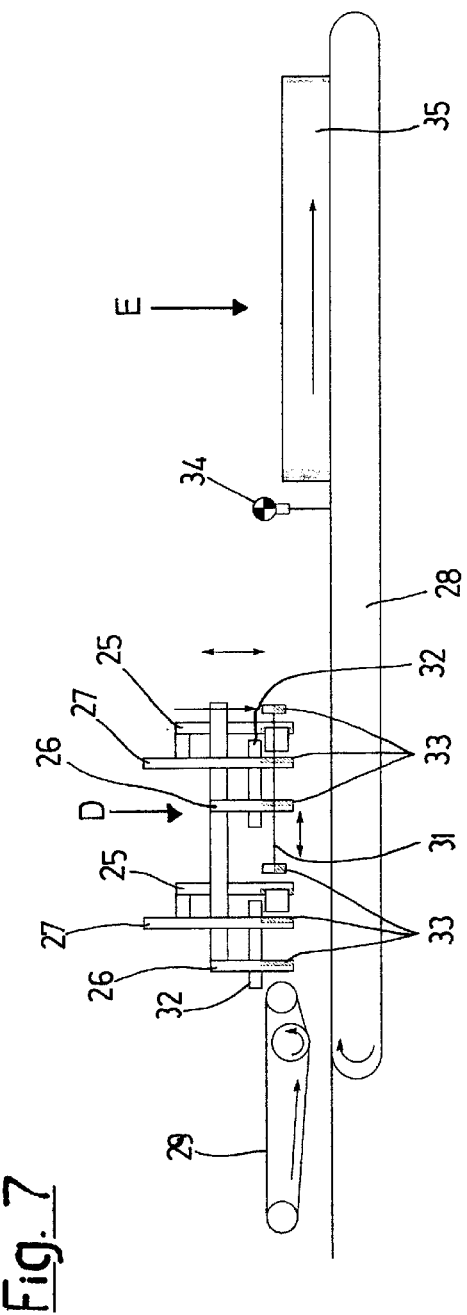
Figure 8:
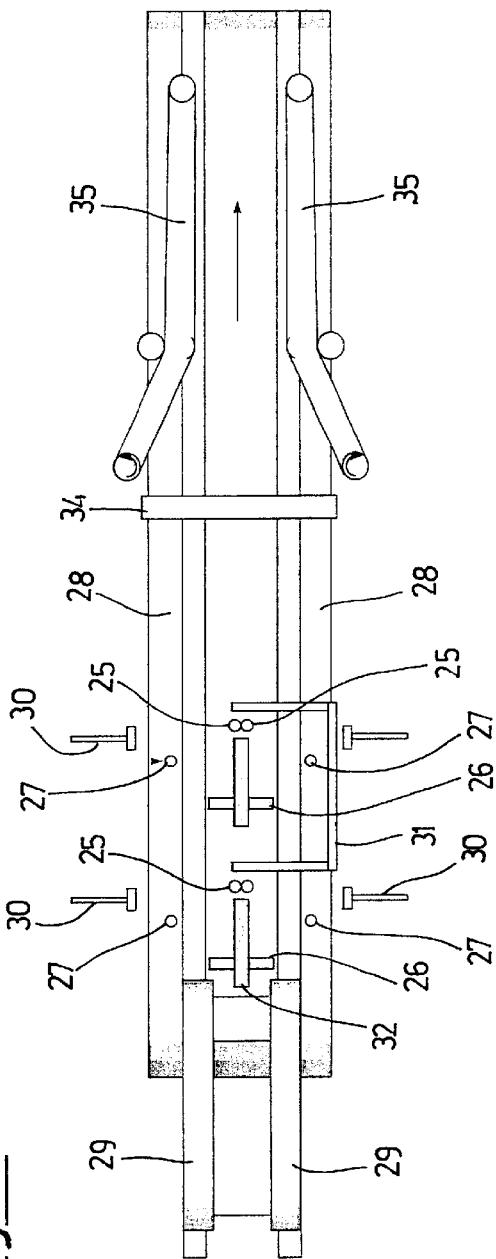
Figure 9:
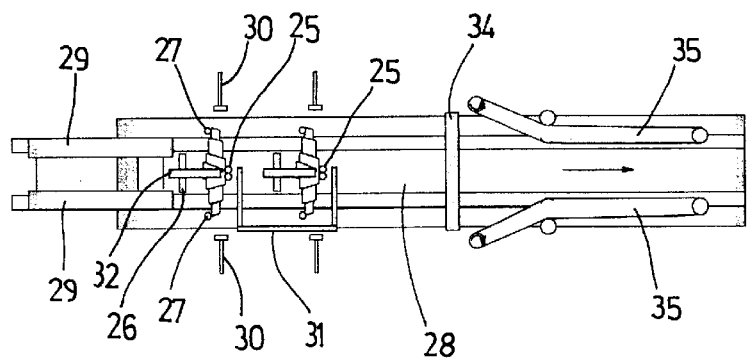
Figure 9A:
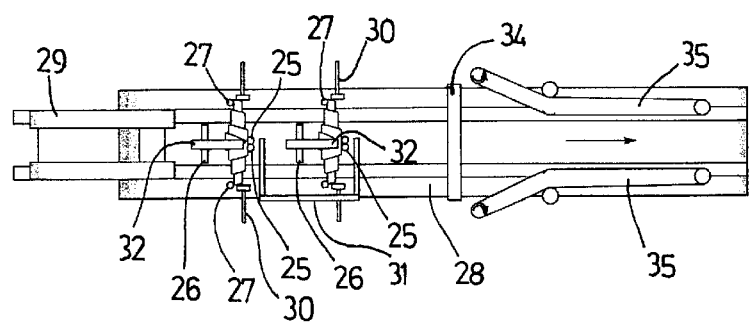
Figure 9B:
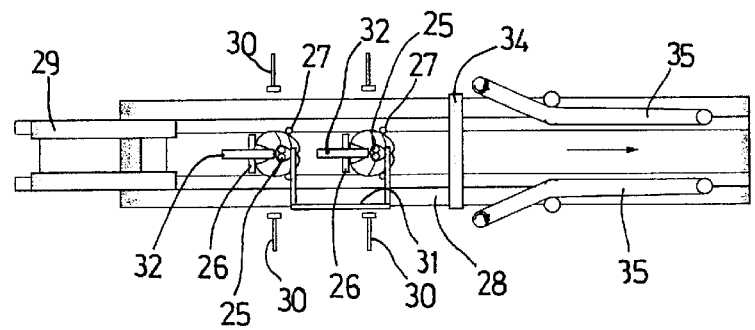
Figure 9C:
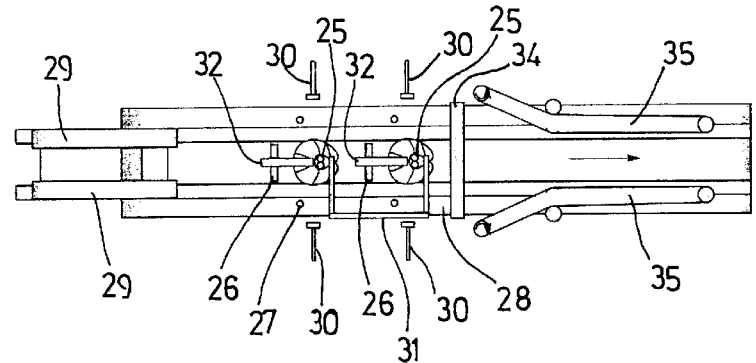
Figure 9D:
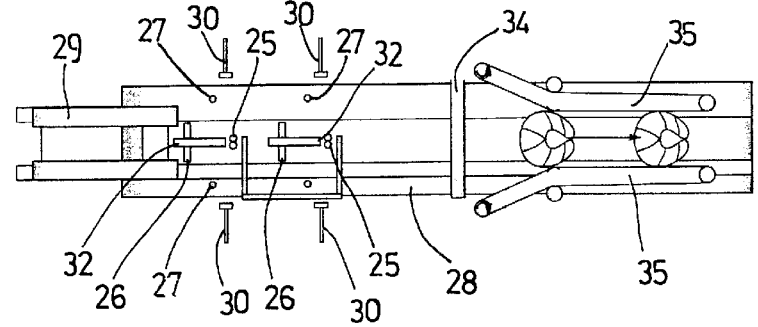

The characteristics and advantages of an apparatus for the folding of croissants according to the present invention will appear more evident from the following illustrative but non-limiting description, referring to the enclosed schematic drawings, in which:

FIG. 1 is a perspective view of a croissant before folding,

FIG. 2 is a raised side schematic view of an apparatus for the folding of croissant according to the invention, FIG. 3 is a plan view of the apparatus of FIG. 2, FIGS. 4 and 5 are enlarged raised and plan views of the distance positioning station of rolls and oriented positioning station of the pointed end of the same rolls of pastry, FIGS. 6, 6a, 6b, 6c and 6d show various successive operating phases of the stations of FIGS. 4 and 5, with the respective schematic sections, FIGS. 7 and 8 are enlarged raised and plan views of the folding stations of rolls of pastry and a discharge station of the same rolls of pastry, FIGS. 9, 9a, 9b, 9c and 9d show various successive operating phases of the stations of FIGS. 4 and 5.

With reference to the figures, an apparatus is illustrated for the folding of croissants according to the invention in which straight croissants are treated one after another on several rows, as indicated with 11 in FIG. 1.

It should be specified that the folding apparatus receives the products arriving from a lane of the rolling machine and consequently, in order to absorb the whole production, folding apparatuses must be installed, as described below, in correspondence with the number of lanes of the croissant production plant.

The whole folding apparatus consists of a certain number of stations in series situated downstream of a pastry roll preparation machine, schematized in A, in which rolls of pastry 11 are obtained from triangles of rolled up pastry with one pointed central external end 13 and thinned facing ends 14.

The rolls 11, detected by a photocell 12, are fed one after another by means of a first conveyor belt 15, to a second positioning station B with a pre-determined pitch distance of the rolls, arranged in the centre with respect to the underlying conveying devices.

It should be noted that said conveying devices in this second station B consist of a central conveyor belt 16 and two longitudinal belts 17. These belts 17 run parallel to each other, at a distance of a length less than that of a roll 11, and they extend below all the stations of the apparatus of the invention.

The centering and pitch regulation operation is effected in the station B.

The rolls 11 which arrive from the first conveyor belt 15 at the inlet of the apparatus reach a stop device 18 which has the function of releasing the roll or similar product on the central belt 16 in a precise selected position from a longitudinal point of view.

There is also a second stop device 18' which has the function of aligning and centering the product on the belt 16, with the help of side actuating elements 19, and releasing it in a precise position with respect to the belt itself.

The outcome of this station is that all the rolls 11 are at a perfect pitch, perpendicular to and centered on the belt.

In this station with the central belt 16, there are also two side belts 17. It should be noted that downstream of the device 18', the central belt 16 ends, and the roll 11 rests on the two side belts 17 alone.

Both the central belt 16 and the side belts or pulleys 17 are moved by a servo motor which controls the movement of the devices 18 and 18' and if the roll 11 upstream is not detected by the photocell 12 in the cycle, it stops the belt 16 and belts 17 until a new roll arrives in the feeding.

The oriented positioning station C is equipped with two pairs of rolls 20 (but there can also be a single pair with a more limited productivity) assembled on a trolley 21, which moves forwards and backwards. Furthermore, the rotation of the rolls 20 on their own axis moves in the same direction.

The pairs of rolls 20 can, each independently, be lifted and lowered into a structure 22 and, as already mentioned, they have a synchronous linear tracking movement of the two side belts 17.

Beneath each pairs of rolls 20, in a slightly inclined position, there is a detector 23 of the pointed end 13 of the roll 11 in question, carried by the rolls 20. The detector 23, for example, can consist of a distance meter, generally a laser, with the function of identifying the position of the point 13 of the triangle in the roll.

The sequence shown in FIGS. 6, 6a, 6b, 6c and 6d illustrates various successive operating phases of the stations in question B and C.

The rolls 11 reach the vertical of the pairs of rolls 20, and the point 13 of the triangle (tongue) is in a random position. The trolley 21 starts moving at the same rate as the two side belts 17, the pairs of rolls 20 rise, lifting the rolls 11 which begin to rotate around their own axis.

When the laser detector 23 identifies the sudden variation in the distance due to the presence of the tongue, the rolls 20 are lowered and deposit the product on the side belts or pulleys 17 again in correspondence with this station.

The position of the tongue is determined in advance with respect to the angular position desired, so that the final position can be varied, by means of software, by the suitable delayed dephasing of the lowering of the pair of rolls 20.

In the actual functioning, the rising of the pairs of rolls 20 is simultaneous, whereas the lowering depends on the moment in which the laser 23 has identified the position of the tongue and this may not take place simultaneously.

The rolls are then laid to rest on the belts 17, correctly oriented, without there being a minimum variation in the pitch.

The trolley 21 rapidly returns to the initial position so as to effect the sequence of operations described above on the two subsequent rolls 11.

Pressure pads 24 are also provided for helping to block the rolls in the desired position, which press the side parts 14 of the roll 11 against the underlying belts 17.

After this station, the rolls 11 thus correctly oriented and distanced, are conveyed by the belts 17 one after another, at a distance with a pre-selected pitch and with the point arranged downwards, under the roll 11.

The apparatus subsequently has a U-folding station D of the rolls 11, thus oriented.

This folding station D comprises a front gage 25 and a rear gage 26 for each roll 11 and a pair of rotating side gages 27 for folding the opposite ends 14 of each roll 11. This station D can also move alternately forwards and backwards on a trolley (not shown), and its gages 25, 26 and 27 can be raised and lowered with respect to the side belts 17 and a central belt 28. From a certain point onwards, in fact, in order to re-form a complete surface, there is said central belt 28 in addition to the two side belts 17 so that the roll 11 rests on a continuous surface.

In the passage from the side belts 17 to the central belt 28, the roll 11 can rotate forwards or backwards and this should be avoided to prevent it from losing from the desired position; two additional upper belts or pulleys 29 are consequently also provided, which press the roll 11 from above and accompany it for a certain distance.

The folding operation of the roll thus arranged according to the sequence of FIGS. 9, 9a, 9b, 9c, and 9d, can therefore initiate.

This is effected by means of a system consisting of the above-mentioned four gages 25, 26 and 27 fixed to the trolley (not shown) which, like the orientation station, can follow two rolls 11 at a time at the same rate as the belts 17 and 28 of the apparatus.

The four gages 25, 26 and 27 (four for each of the two units), are lowered on the rolls 11, after which the following operations are effected.

Thanks to the presence of final centering elements 30, the rolls 11 are centered to guarantee their correct positioning.

The rear gage 26 then advances, pushing the central part of the roll 11 against the front gage 25.

Immediately afterwards, the side gages 27 rotate forcing the side parts 14 of the roll 11 to bend symmetrically: at the end of the rotation, a pressing element 31 is lowered and compresses the points 14 of FIG. 1 against the supporting surface.

At this point, the gages 27 rotate backwards and the rear gage 26 moves backwards. The pressing element 31, and all the gages, are subsequently raised leaving the folded product completely free.

The presence of an upper gage 32 ensures that the roll 11 does not stick and is consequently not lifted together with the trolley.

The trolley rapidly returns to the initial position to effect the sequence of operations described above on the following two rolls.

In order to avoid any possible adhesion of the rolls against the contact surfaces of the gages, the latter consist of hollow bodies with holes 33 in correspondence with the contact points of each roll 11. During the release operation, compressed air is injected in order to favour the detachment of the roll from the gages.

The above operations take place simultaneously on the two products treated, which then proceed towards the last station.

In order to guarantee the transversal alignment of the ends, a pallet 34 stops the roll 11 for a few moments and aligns it.

The last station E consists of two vertical belts 35 which symmetrically grip the folded roll 11, increasing and maintaining the folding.

The main variation to the system consists in the number of rolls and consequently orientation and folding apparatuses used simultaneously, in order to satisfy the required operating capacity.

The system described above is replicated for each lane, and after effecting the transversal alignment of the rolls, the operations advance simultaneously, with the exception of the end of the orientation which, as already mentioned, varies according to the initial position of the tongue.

It can thus be observed how the apparatus for the folding of croissants according to the present invention, achieves the objectives listed above.

The apparatus for the folding of croissants of the present invention thus conceived can undergo numerous modifications and variations, all included in the same inventive concept.

Furthermore, in practice, the materials used, as also their dimensions and components, can vary according to technical demands.

I claim:

1. An apparatus for the folding of croissants comprising in series, downstream of at least one preparation station (A) of rolls (11) of pastry, obtained from triangles of pastry rolled up with one pointed central external end (13), and fed one after another, a positioning station (B) with a pre-determined pitch distance of said rolls (11) in a central position with respect to underlying conveying devices (16, 17), an oriented positioning station (C) of said pointed end (13) on said underlying conveying devices (17) and a U-folding station (D) of said pastry rolls (11), in which said folding station (D) comprises front gages (25) and rear gages (26) for each roll (11) and rotating side gages (27) for the folding of opposite ends of each roll (11), said oriented positioning station (C) and said folding station (D) being movable alternately forwards and backwards.

2. The apparatus according to claim 1, characterized in that said oriented positioning station (C) of said pointed end (13) on said underlying conveying devices (17), comprises at least one pair of rolls (20), rotating in the same direction, assembled on a trolley (21) movable forwards and backwards inside the apparatus and which can be lifted to collect one of said rolls, there being detecting devices (23) of said central external pointed end (13) of each of said rolls (11), when situated below said roll (11), which cause the re-lowering of said pair of rolls (20) on said underlying conveying devices (17) and the release of each roll thus oriented.

3. The apparatus according to claim 2, characterized in that said detecting devices of each central external pointed end (13) of each of said rolls (11) consist of a laser distance meter (23).

4. The apparatus according to claim 1, characterized in that centering elements (30) of said rolls with respect to said underlying conveying devices are associated with said U-folding station (D) of said rolls, once oriented with the pointed end (13) facing downwards on said underlying conveying devices (17, 28), when said rolls (11) are positioned in correspondence with said front gages (25), rear gages (26) and rotating side gages (27).

5. The apparatus according to claim 4, characterized in that said front gages (25) and rear gages (26) are movable with respect to each other, to block one of said rolls (11) arranged in a central position in correspondence therewith, wherein said front gages (25) participate in the folding with a central portion of said roll.

6. The apparatus according to claim 4, characterized in that said front, rear and rotating side gages can be moved upwards in correspondence with said rolls, fed one after another and arranged according to said predetermined pitch distance on said underlying conveying devices.

7. The apparatus according to claim 4, characterized in that said front, rear and rotating side gages are equipped with blowing elements (33) to prevent the adhesion of said roll of pastry (11).

8. The apparatus according to claim 1, characterized in that said underlying conveying devices comprise a pair of belts (17), side by side and at a distance of a length less than that of a roll, which extend below all the stations of the apparatus.

9. The apparatus according to claim 1, characterized in that said pair of belts (17) advances at an equal rate to both that of said oriented positioning station (C) and that of said folding station (D), when advancing in their forward movement.

10. The apparatus according to claim 8 or 9, characterized in that, in correspondence with said oriented positioning station (C) and said folding station (D), a central conveyor belt (28) is associated with said pair of belts (17).

11. The apparatus according to claim 1, characterized in that it comprises a final station (E) comprising two vertical belts (35) which symmetrically grip said folded roll of pastry (11), increasing and maintaining the folding.

* * * * *